United States Patent [19]

Takahashi et al.

[11] Patent Number: 4,946,528
[45] Date of Patent: Aug. 7, 1990

[54] METHOD AND EQUIPMENT FOR PRODUCING PROTECTIVE-COATED STEEL PIPE

[75] Inventors: Isao Takahashi; Toyokazu Sakaki, both of Tokyo, Japan

[73] Assignee: Kawasaki Steel Corporation, Hyogo, Japan

[21] Appl. No.: 271,088

[22] Filed: Nov. 14, 1988

[30] Foreign Application Priority Data

Nov. 18, 1987 [JP] Japan .............................. 62-291530
May 24, 1988 [JP] Japan .............................. 63-126860
May 24, 1988 [JP] Japan .............................. 63-126861
May 24, 1988 [JP] Japan .............................. 63-126862

[51] Int. Cl.$^5$ .......................................... B65H 81/08
[52] U.S. Cl. ................................ 156/187; 156/195; 156/304.6; 156/425; 156/429; 156/499
[58] Field of Search ............... 156/187, 188, 190–192, 156/195, 289, 425, 428, 429, 392, 304.2, 304.6, 157, 143, 144

[56] References Cited

U.S. PATENT DOCUMENTS

| | | | |
|---|---|---|---|
| 1,736,911 | 11/1929 | Gray | 156/187 |
| 2,161,036 | 6/1939 | Gremmel | 156/187 |
| 3,126,306 | 3/1964 | Sherman | 156/187 |
| 3,157,549 | 11/1964 | Morain | 156/289 X |
| 4,177,100 | 12/1979 | Pennington | 156/304.6 |
| 4,514,245 | 4/1985 | Chabrier | 156/187 X |
| 4,732,632 | 3/1988 | Pieslak et al. | 156/188 X |

FOREIGN PATENT DOCUMENTS 57-89923  4/1982  Japan .................................. 156/187

Primary Examiner—David Simmons
Attorney, Agent, or Firm—Balogh, Osann, Kramer, Dvorak, Genova & Traub

[57] ABSTRACT

An improved method for producing a protective-coated steel pipe in a construction work site by spirally winding and melt-bonding a belt-like thermoplastic synthetic resin sheet around the outer peripheral surface of a steel pipe, for use as a construction member in corrosive circumstances, the method provides a winding step winding the sheet around the outer peripheral surface of the steel pipe while contacting adjacent side end faces of the sheet in a face-to-face relation to each other and a bonding step of heat melt-bonding the adjacent sheet portions to each other in the contacted state of the respective side end faces while pressing both sheet portions together by a pressing means when they begin to melt. Also disclosed is an equipment used for practicing the said method. According to these method and equipment, the resin of the sheet comes into completely close contact with the steel pipe so the corrosion resistance of the pipe is improved remarkably.

7 Claims, 11 Drawing Sheets

METHOD AND EQUIPMENT FOR PRODUCING PROTECTIVE-COATED STEEL PIPE

BACKGROUND OF THE INVENTION

1. Field of the Invention

The present invention relates to method and equipment for producing a protective-coated steel pipe having a thermoplastic synthetic resin coating formed on the outer peripheral surface thereof for use, for example, as a foundation pile in civil engineering works.

2. Description of the Prior Art

Some of the structures such as bridges and piers built on the sea are supported on bearing piles which are driven into the bottom of the sea. In this case, steel pipe posts are disposed between such a structure and the tops of the bearing piles. The portions of the steel pipe posts which are in contact with the surface of the sea, as well as the portions thereof positioned thereabove, are exposed alternately with sea water and air due to ebb and flow of the tide and through splashes of waves, so those portions are most likely to be corroded. Therefore, anticorrosive measures for those portions are particularly important. The following are examples of conventional corrosionproof steel pipes used for this purpose:

(1) a corrosionproof steel pipe with a urethane- or epoxy-based coating material applied as thick as 3 mm or so;

(2) a protective-coated steel pipe comprising a steel pipe and a coating (e.g. a melt-extruded coating of polyethylene) formed on the outer peripheral surface of the steel pipe by extruding molten polyolefin resin continuously onto the same surface; and (3) a spiral tape wound pipe of which tape winding is prepared in a construction work site such as that disclosed in Japanese Patent Laid-Open No. 40925/86.

Such conventional corrosionproof steel pipes involve the following problems.

In the pipe (1), the cost of the coating material is high.

In the case of the pipe (2) according to the polyethylene melt-extrusion coating method, the manufacturing equipment is very expensive and the cost of transport of the steel pipe after anticorrosion processing is high because vulnearable coating must be enoughly protected during delivery. Further, the pipe may be flawed during handling in transit, thus requiring considerable labor for its repair.

According to the above technique (3), a heat-shrinkable polyolefin tape having an adhesive layer formed of a thermoadherent polyolefin which has an adherent functional group is wound spirally around the peripheral surface of the steel pipe pile while being partially overlapped at side edges portions thereof. In such a steel pipe pile, a gap is formed between the overlapped part of the tape and the pipe, which gap causes corrosion. And it is difficult to form the tape winding start and end in good shape.

Further, in seasons or districts wherein the climate temperature is low, the heat-shrinkable polyolefin tape hardens and loses flexibility out of doors. Consequently, when pushed against the surface of the steel pipe, the tape does not fit closely on the surface, and even when the steel pipe is preheated to a predetermined temperature, the shape of the tape just after pressure bonding thereof to the pipe is unstable and there remains a gap between the tape and the steel pipe. This affects the pipe even after pressure bonding of the tape to the pipe and prevents the tape from forming a uniform coating.

SUMMARY OF THE INVENTION

It is an object of the present invention to provide method and equipment for preparing a protective-coated steel pipe, in a construction work site capable of winding a thermoplastic synthetic resin coating around the outer peripheral surface of a preheated steel pipe spirally without leaving air gap underneath the coating.

It is another object of the present invention to provide a method for processing coating ends of a protective-coated steel pipe whereby the winding start and end portions of a thermoplastic synthetic resin coating wound spirally around the outer peripheral surface of a preheated steel pipe can be removed in a simple manner.

It is a further object of the present invention to provide method and equipment wherein a synthetic resin sheet is preheated and thereby can be wound uniformly around the outer peripheral surface of a steel pipe in completely close contact therewith out of doors even when the outside air temperature is low.

It is a still further object of the present invention to provide an inexpensive equipment capable of effecting a protective coating work at a construction work site.

The method for producing a protective-coated steel pipe according to the present invention which achieves the above-mentioned objects involves a winding step of winding a belt-like thermoplastic synthetic resin sheet spirally around the outer peripheral surface of a preheated steel pipe while contacting adjacent side end faces of the sheet with each other in a face-to-face relation, and a bonding step of thermally melt-bonding the adjacent sheets together while pressing both sheets at a time by a pressing means. Further, cuts for shaping are made in the winding start and end portions of the above melt-bonded sheet at a high temperature.

The method of the invention further includes a sheet preheating step of preheating the foregoing thermoplastic synthetic resin sheet to room temperature at the lowest before it contact with the outer peripheral surface of the steel pipe.

The equipment for producing a protective-coated steel pipe according to the present invention includes a sheet feed means for feeding a thermoplastic synthetic resin sheet so that adjacent side end faces of the sheet are confronted with each other, and a confronted seam pressing means whereby the confronted seam portion at the sheet side ends which began to melt on the outer peripheral surface of the steel pipe is pressed against the same surface.

Where required, the equipment of the invention is provided with a sheet preheating means for preheating the thermoplastic synthetic resin sheet to at least room temperature.

The equipment of the invention is further provided with a feed mechanism for moving the aforementioned sheet feed means and sheet pressing means relatively in the longitudinal direction of the steel pipe, and a horizontal slide means for adjusting the sheet-winding angle and winding pitch with respect to the steel pipe.

DESCRIPTION OF PREFERRED EMBODIMENTS

Figure 1:
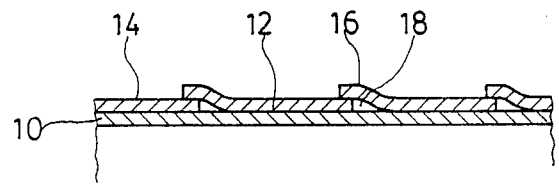
FIG. 1 is an enlarged sectional view of sheet seam portions of a conventional protective-coated steel pipe.

The protective-coated steel pipe of the foregoing Japanese patent laid-open 40925/86 shown in FIG. 1 comprises a steel pipe pile 10 and a heat-shrinkable polyolefin tape 14 having an adhesive layer 12 and wound around the peripheral surface of the steel pipe pile 10. In this steel pipe, a gap 18 is formed in an overlapped portion 16 of side edges of the tape 14. The ingress of water, etc. into the gap 18 causes rusting, with the result that the polyolefin tape 14 peels off.

Particularly, since the gap 18 formed along the spiral overlapped portion 16 is spirally continuous longitudinally of the steel pipe, it is likely that the aforesaid rusting, etc. will occur wholly in the longitudinal direction of the steel pipe.

In the present invention, when a belt-like thermoplastic synthetic resin sheet is wound and melt-bonded around the outer peripheral surface of a preheated steel pipe, adjacent side end faces of the sheet are contacted with each other in face-to-face relation, then when the thus-contacted adjacent sheet portions begin to melt, they are melt-bonded together by the application of heat while both seam portions are pressed simultaneously by a pressing means. Therefore, such overlapped portion 16 as in the conventional protective-coated steel pipe is not formed, that is, the gap 18 is not formed. Consequently, such phenomena as rusting caused by the ingress of water into the gap and the resulting peeling-off of the protective coating do not occur at all.

The thermoplastic synthetic resin used in the present invention may be a conventional resin which has not been subjected to a treatment for imparting heat-shrinkability thereto.

Figure 3:
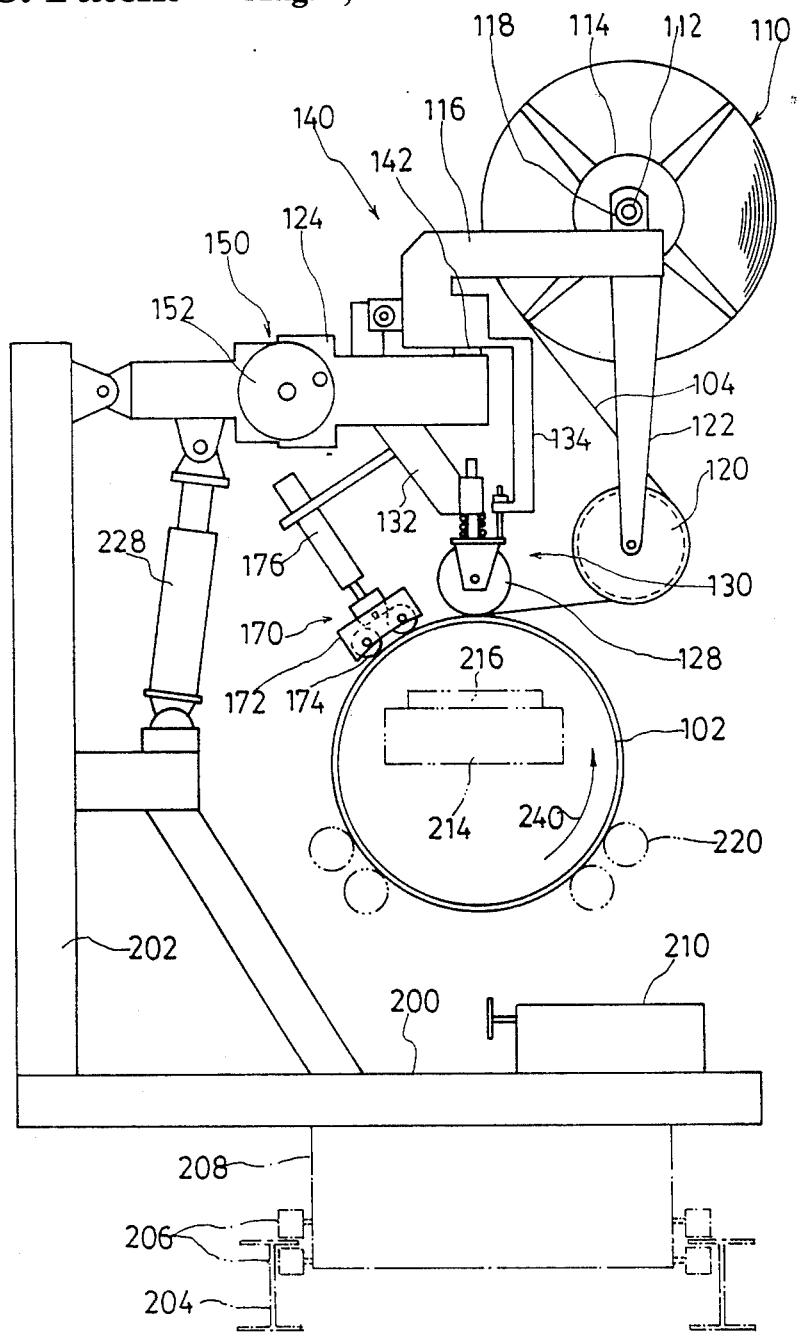
FIG. 3 is a side view of a protective-coated steel pipe producing equipment according to an embodiment of the present invention.
Figure 4:
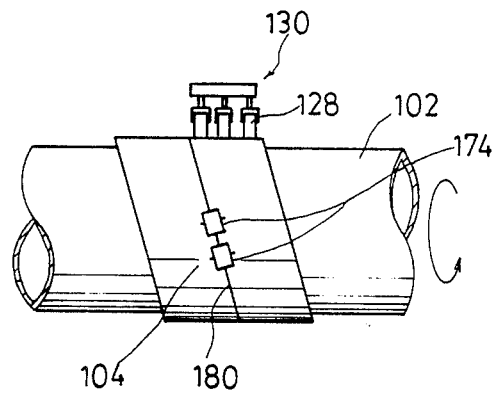
FIG. 4 is a schematic front view of a principal portion of FIG. 3.

Referring now to FIGS. 3 and 4, there is illustrated a protective-coated steel pipe producing equipment according to an embodiment of the present invention. This equipment is constructed so that a thermoplastic synthetic resin sheet 104 having a thickness of 2-4 mm (e.g. 3 mm) and a width of 100-1,000 mm (e.g. 500 mm) can be spirally wound around the outer peripheral surface of a spiral steel pipe 102 having an outside diameter of 660 mm.

In this embodiment, in consideration of weathering resistance, a polyethylene sheet is used as the thermoplastic synthetic resin sheet 104. More specifically, the polyethylene sheet 104 is a two-layer polyethylene sheet having an outer surface formed of an ordinary polyethylene and an inner surface formed of an adhesive, modified polyethylene. Preferably, the latter adhesive, modified polyethylene is one obtained by reacting a low- or high-density polyethylene with maleic anhydride. Any other known adhesive functional group than maleic anhydride group may be incorporated in such polyethylene. Further, other polyolefins than polyethylene, or copolymers with vinyl acetate, are also employable examples of the thermoplastic synthetic resin. If necessary, the thermoplastic synthetic resin may contain additives and fillers such as, for example, anti-oxidant and carbon black.

A sheet feed means 110 is for feeding the thermoplastic synthetic resin sheet 104 wound coilwise around a reel 114 mounted on a horizontal rotary shaft 112, continuously from an oblique angle with respect to the longitudinal direction of the steel pipe 102.

The rotary shaft 112 is rotatably supported on a support frame 116, with a brake 118 mounted on a shaft end. The brake 118 is for imparting an appropriate resistance to the thermoplastic synthetic resin sheet coil being delivered from the reel 114 to thereby strain the sheet 104 to the extent of preventing loosening of the sheet. For example, it may be a friction brake of a simple type such that the braking strength can be adjusted by adjusting the nut tightening force.

A guide roll 120 is suspended through an arm 122 from the distal end of the support frame 116.

The sheet feed means 110 is attached to a horizontal support 124 and it can turn within a horizontal plane about a swing shaft 142 by the operation of a handle (not shown).

To the underside of the horizontal support 124 is secured a holding arm 132 of a sheet pressing means 130. The sheet pressing means 130 has a plurality of sheet pressing rolls 128 for pressing the thermoplastic synthetic resin sheet 104 against the outer peripheral surface of the steel pipe 102. The sheet pressing rolls 128 are horizontally pivotable in interlock with the sheet feed means 110 through a connecting arm 134.

Further provided is a horizontal slide means 150 for moving the sheet feed means 110 and the sheet pressing means 130 linearly horizontally in the pipe axis direction integrally through the horizontal support 124 to thereby adjust the winding angle and pitch of the thermoplastic synthetic resin sheet 104 to be wound spirally around the steel pipe 102.

In this embodiment, a feed handle 152 of the horizontal slide means 150 is operated to made preadjustment so that the thermoplastic synthetic resin sheet 104 is spirally wound around the steel pipe 102 while adjacent side end faces thereof are contacted in a face-to-face relation.

The horizontal slide means 150 is not always necessary for winding the sheet in such fashion. But the provision thereof permits shifting of the sheet feed means 110 and the sheet pressing means 130, so is advantageous in that it is possible to immediately cope with changes in shape and size of the steel pipe 102 and in size of the thermoplastic synthetic resin sheet 104.

On the lower surface side of the horizontal support 124 is further mounted a confronted seam pressing means 170. In this embodiment, the confronted seam pressing means 170 is provided with a pair of rollers which are mounted to a bracket 172 in conformity with the curvature of the outer surface of the steel pipe 102, and a pressing means 176 such as, for example, an air cylinder (or a spring mechanism).

In FIG. 4, which is a front view of the steel pipe 102 shown in FIG. 3, the rollers 174 are disposed along a confronted seam 180 in conformity with a preset sheet winding angle in order to press the seam 180 of the thermoplastic synthetic resin sheet 104 spirally wound around the steel pipe 102.

The sheet feed means 110, sheet pressing means 130 and confronted seam pressing means 170 are mounted on a base 200 through a post 202. The base 200 is mounted on a car 208 which travels on a track 204 through wheels 206. The car 208 in this embodiment is driven through a chain (not shown) which is driven by an electric motor 210 mounted on the base 200. To the car 208 is fixed a long cantilever 214 for insertion into the steel pipe 102, and to the distal end of the cantilever 214 is attached a gas burner 216 for heating the steel pipe 1 from the inner surface side. The steel pipe 102 is mounted on drive rolls 220 which are disposed in the space above the track 204, the pipe being rotatable at constant speed about the axis thereof.

The reference numeral 228 denotes a worm jack for retracting the sheet feed means 110, sheet pressing means 130 and confronted seam pressing means 170, to respective positions above the steel pipe 102.

The operation of this equipment will be described below.

The steel pipe 102 is placed on the drive rolls 220 and is rotated about its axis in the direction of an arrow 240 at a constant speed. It is then preheated to about 200° C. as the temperature of its outer peripheral surface by means of the gas burner 216 inserted in the interior of the pipe. This preheating temperature has been determined experimentally in the following manner.

In order to prevent peeling-off of the polyethylene coating in the sea water over a long period of time, it is preferable that a primer, e.g. epoxy primer, be applied in advance onto the outer peripheral surface of the steel pipe 102.

However, the epoxy primer, including both one-can and two-pack types, contains a volatile matter, so it evolves gas at a heat-melting temperature (140°–240° C.) of polyethylene, thus causing the polyethylene coating to be swollen or wrinkled. To remove the gas in advance, it is necessary to heat the primer to a temperature above the heat-melting temperature of polyethylene to expel the volatile matter for drying.

In this connections, experiments were made to determine an epoxy primer preheating temperature for drying in which the epoxy primer applying temperature to steel pipe was set at 80° C.

(1) Steel pipes to which the epoxy primer was applied and then dried at 160° C. and subsequently the polyethylene resin sheet melt-bonded under heating at 190° C., were all swollen throughout the surface thereof.

(2) Steel pipes to which the epoxy primer was applied and then dried a 200° C. and subsequently the polyethylene resin sheet melt-bonded under heating at 190° C., were not swollen.

(3) Steel pipes to which the epoxy primer was applied and then dried at 250° C. and subsequently the polyethylene resin sheet melt-bonded under heating at 190° C. were not swollen, but deteriorated in bonding strength.

From the above results, the most suitable preheating temperature was found to be 200° C. higher by 10° C. than the heat-melting temperature 190° C. of the polyethylene resin sheet.

The thermoplastic synthetic resin sheet 104 is fed to the outer peripheral surface of the preheated, hot steel pipe 102 continuously at an oblique angle with respect to the pipe axis, namely, obliquely at a predetermined angle, from the sheet feed means 110 through the guide roll 120. This sheet feeding operation is performed while the car 208 on the track 204 is moved, allowing the sheet feed means 110 to move at a constant speed along the pipe axis, under operation of the motor 210.

Figure 5:
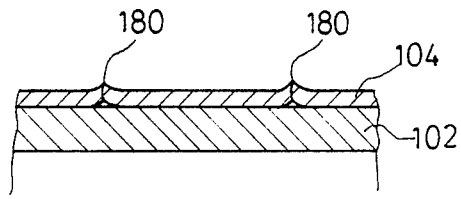
FIG. 5 is an enlarged sectional view of confronted sheet seam portions before pressing by a confronted seam pressing means.
Figure 6:
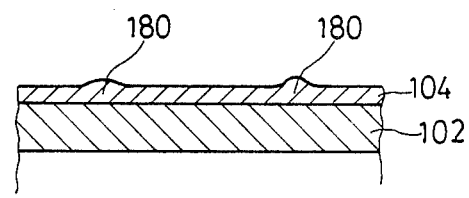
FIG. 6 is an enlarged sectional view of the confronted sheet seam portions after pressing by the confronted seam pressing means.

The sheet 104 thus fed is wound under pressure around the outer peripheral surface of the steel pipe by means of the sheet pressing rolls 128. This winding is performed while adjacent side end faces of the sheet are contacted in a face-to-face relation. Since the sheet 104 expands thermally, the confronted seam 180 softens while swelling and begins to melt as shown in FIG. 5. The thus-swollen confronted seam 180 is pressed by the rollers 174 of the confronted seam pressing means 170, whereby the air present between the swollen portion of the sheet 104 and the steel pipe surface is expelled, so that the confronted seam 180 as well as the sheet 104 and the outer peripheral surface of the steel pipe 102 are melt-bonded in a closely contacted state, as shown in FIG. 6. In this way the thermoplastic synthetic resin sheet 104 spirally wound around the steel pipe 102 is firmly melt-bonded to the outer peripheral surface of the pipe without leaving any gap. After winding by a predetermined length, the sheet 4 is cut with a cutter.

Thus, a good protective coating having neither an overlapped portion of the sheet 104 nor remaining air is formed on the outer peripheral surface of the steel pipe 102.

Figure 7:
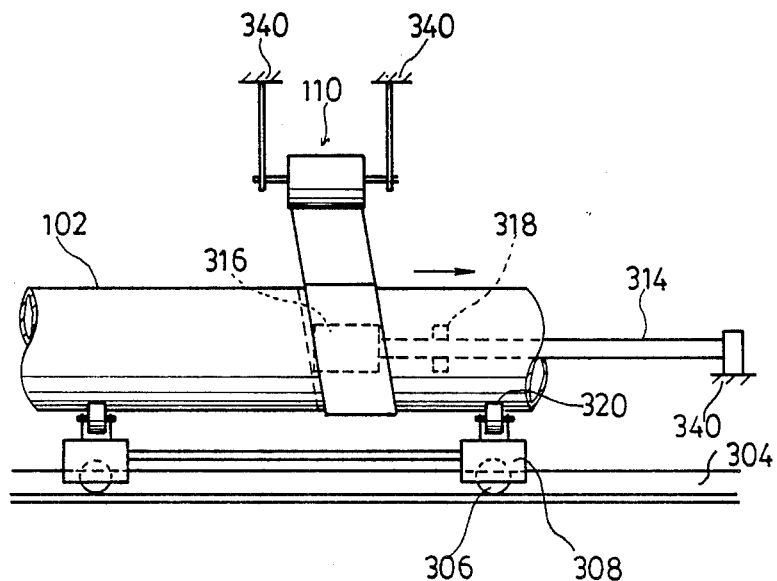
FIG. 7 is a schematic side view of a protective-coated steel pipe producing equipment according to another embodiment of the present invention.

Referring now to FIG. 7, there is illustrated another embodiment, in which the foregoing sheet feed means 110, sheet pressing means and confronted seam pressing means, as well as a gas burner 316 attached to a cantilever 314, and a cooling device 318 for cooling the inner surface of the steel pipe 102 after heat melt-bonding of the sheet to the pipe, are all fixed to a stationary frame 340. On the other hand, on a car 308 adapted to travel on a track 304 are mounted drive rolls 320 together with a drive motor (not shown) for rotating the steel pipe. The car 308 contains an electric motor to drive wheels 306.

The steel pipe 102 is placed on the drive rolls 320 and conveyed in the pipe axis direction at a constant speed by the car 308 while being rotated about the pipe axis at a constant speed.

This embodiment is advantageous in that the worker can perform operations at the same place without changing place.

The protective-coated steel pipe producing equipment of this embodiment is far simpler in structure and less expensive than conventional polyethylene melt-extruding and coating equipment. Besides, no special installing foundation is needed, so the transport and installation of the equipment are easy. Once the equipment is transported to a construction work site and installed, it becomes possible to effect the production of the protective-coated steel pipe. Consequently, the cost required for transporting factory-manufactured protective-coated steel pipes to the work site can be cut down to a great extent.

The following description is now provided about an example of using a heater in the invention.

Figure 8:
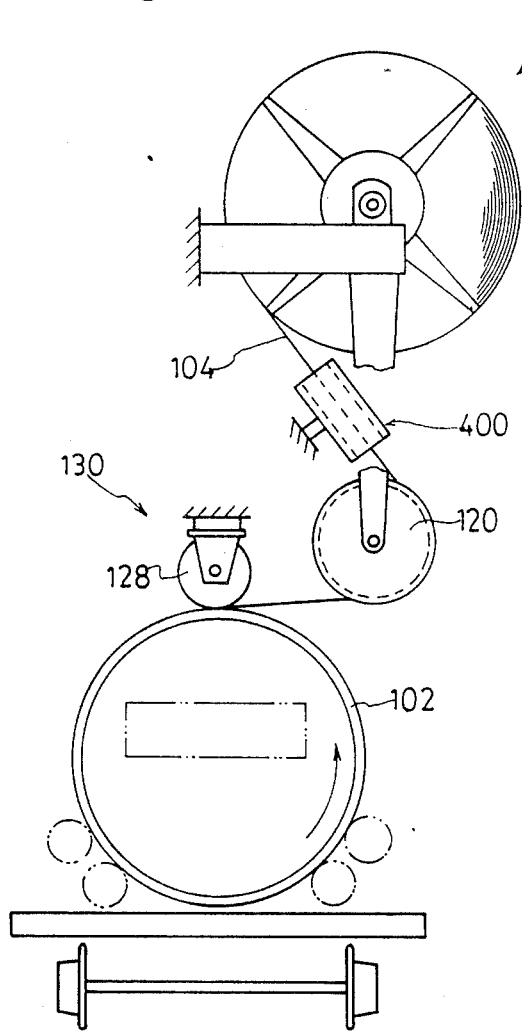
FIG. 8 is a schematic side view of a protective-coated steel pipe according to a modification in the invention.

FIG. 8 is a side view of a principal portion of the equipment of FIG. 3, with a modification added thereto. In the modification shown in FIG. 8, the sheet is preheated. More specifically, the belt-like thermoplastic synthetic resin sheet is preheated to room temperature or thereabouts before being spirally wound around the outer peripheral surface of the steel pipe which has been preheated. By so doing, the sheet which has become hard under a low temperature environment becomes more compatible with the steel pipe surface.

Between the sheet feed means 110 and the sheet pressing means 130 is disposed a preheating means 400 for preheating the thermoplastic synthetic resin sheet 104 which is fed out of the sheet feed means. Where the outside air temperature is low, the sheet 104 which is fed in a hard condition by the sheet feed means 110 is preheated by the preheating means 400 and given flexibility thereby. The preheating means 400 is formed in the shape of a box covered with a heat insulating material, through which the sheet 104 can pass throughout its entire width. Heating may be done using a built-in electric heater or gas heater, or by introducing heated air from the exterior. A heating temperature which permits the thermoplastic synthetic resin sheet 104 to be heated to room temperature of 20° C. or thereabouts is sufficient. However, when it is taken into account that the heating temperature differs depending on the kind, thickness and width of the sheet, it is desirable to set it in the range of 20° to 60° C.

The operation of the sheet heating means will be described below.

As an example, the preheating temperature of the sheet preheating means for softening the sheet was determined experimentally in the following manner.

A hard polyethylene sheet 104 having a thickness of 3 mm and a width of 500 mm was heat melt-bonded to the steel pipe 102 without preheating when the outside air temperature was 2° C.; as a result, air remained between the sheet and the outer peripheral surface of the steel pipe 102, causing swelling. On the other hand, when the sheet was preheated up to 20° C. by the sheet preheating means 400, the compatibility between the sheet 104 and the steel pipe 102 was remarkably improved, causing no swelling.

On the basis of such experimental results the thermoplastic synthetic resin sheet 104 was preheated up to 20° C. by the sheet preheating means 400 and then fed to the outer peripheral surface of the steel pipe 102 which was hot because of having preheated to 200° C., from an oblique angle with respect to the pipe axis, continuously through the guide roll 120. This sheet feeding operation is performed while the steel pipe 102 is moved relatively in the pipe axis direction and at the same time rotated at a constant speed.

The sheet 104 thus fed is brought into pressure contact with the outer peripheral surface of the steel pipe 102 by means of the sheet pressing rolls 128 and wound therearound in this state. Even when the outside air temperature is low, since the sheet 104 has been preheated by the sheet preheating means 400 and thereby softened, it is easily compatible with the steel pipe surface and so can be easily wound therearound without leaving air between the sheet and the pipe. In this way there is performed a spiral winding of the sheet and the sheet is heat melt-bonded firmly to the outer peripheral surface of the pipe 102. After winding by a predetermined length, the sheet 104 is cut with a cutter.

Thus, even under a working environment wherein the outside air temperature is low, a good protective coating free of residual air can be formed on the outer peripheral surface of the pipe.

Although in the above embodiment the sheet preheating means 400 is disposed between the sheet feed means 110 and the guide roll 120, this arrangement does not constitute any limitation. For example, the sheet preheating means 400 may be disposed between the guide roll 120 and the sheet pressing rolls 128, or the guide roll 120 itself may be heated, if only the thermoplastic synthetic resin sheet 104 can be preheated before it is pressed against the steel pipe surface.

The following description is now provided about how to process the winding start and end portions of the sheet on the same pipe as in the above embodiment.

Figure 2:
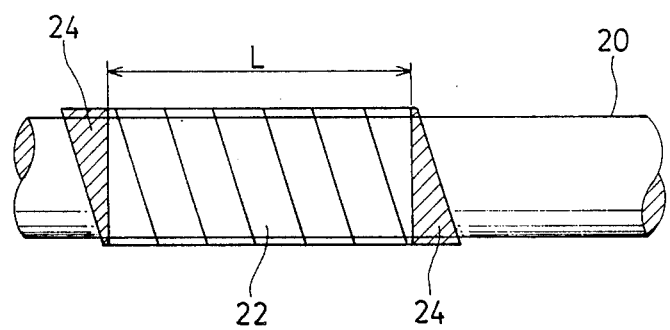
FIG. 2 is a side view showing unnecessary portions at the coating ends of the conventional protective-coated steel pipe.

In a conventional steel pipe 20 shown in FIG. 2, a tape 22 is strongly bonded to the pipe not only in a range L which requires coating but also at unnecessary portions 24 of both ends which should be removed. Therefore, much labor is needed to remove the tape from those portions. For example, it has heretofore been necessary to make reheating to let the tape peel off or use a peeling device to remove the tape mechanically.

In the present invention, cuts are made in a high temperature condition in the winding start and end portions of the thermoplastic resin sheet which has been melt-bonded to the outer peripheral surface of the steel pipe. These cuts form uniform openings in the sheet when cooled. Therefore, if a less adhesive coating is wound around the outer peripheral surface of the steel pipe in advance and the portions to be removed are put thereon, it will be possible to remove sheet end portions easily from the said openings.

Figure 9:
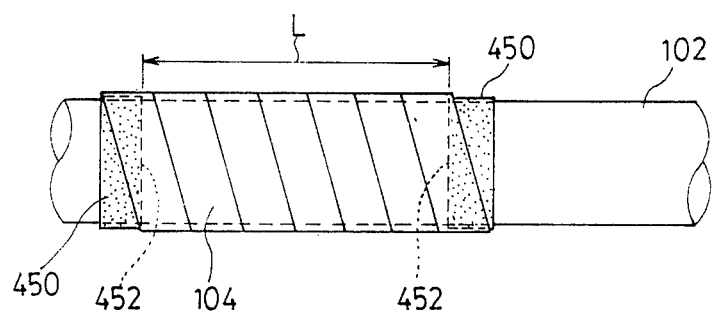
FIG. 9 is a schematic side view explanatory of a processing method for coating ends of a protective-coated steel pipe according to the invention.

Referring now to FIG. 9, before the thermoplastic synthetic resin sheet 104 is wound around the outer peripheral surface of the steel pipe 102, a coating 450 comprising a thin tape which is not so strong in bonding force is formed beforehand on the outer peripheral surface of the steel pipe at side end portions of a range L which requires coating, namely, at the winding start and end portions of the sheet. The coating 450 may be wound one turn perpendicularly to the pipe axis.

The preheated steel pipe 102 is slowly moved relatively in the pipe axis direction while rotating about the pipe axis at a constant speed. This relative movement may be done by moving the steel pipe 102 or by moving the thermoplastic synthetic resin sheet 104. The sheet 104, which is belt-like, is fed to the heated outer peripheral surface of the steel pipe 102 continuously obliquely at a predetermined angle with respect to the pipe axis. By adjusting the feed angle and feed pitch, it is possible to wind the sheet in a closely contacted state of the side edges of the sheet.

The sheet 104 is partially put on the coating 450 at its winding start and end portions as shown in FIG. 9.

While the sheet 104 is wound spirally around the steel pipe 102, it is pressed against the outer peripheral surface of the pipe elastically using, for example, pressing rollers to thereby expel the air present between the sheet seam 180 and the outer peripheral portion of the steel pipe 102, allowing the sheet to be heat melt-bonded in a closely contacted state.

Cuts 452 are made in a high temperature condition in the boundaries between the range L and unnecessary portions at the sheet winding start and end portions. This can be done easily by merely pushing the edge of a cutter against a predetermined part of the steel pipe 102 being rotated.

While the winding and melt-bonding of the thermoplastic synthetic resin sheet 104 proceeds successively from a predetermined position on the steel pipe 102, the portion of the sheet which has already been melt-bonded to the pipe is cooled forcibly. For example, the cooling is done by spraying cooling water from the inner surface side of the steel pipe 102 or by spraying water or air from the outer surface of the pipe. When the steel pipe 102 held in a high temperature condition is cooled, the thermoplastic synthetic resin sheet 104 shrinks and so the cuts 452 open uniformly. Consequently, the unnecessary portions at both ends of the sheet 104 can be easily removed from the outer peripheral surface of the steel pipe 102 together with the less adhesive coating 450.

If necessary, the coating ends after removal of the unnecessary portions may be treated with a sealing agent. Thus, the unnecessary portions at the protective coating ends can be removed extremely easily.

Figure 10:
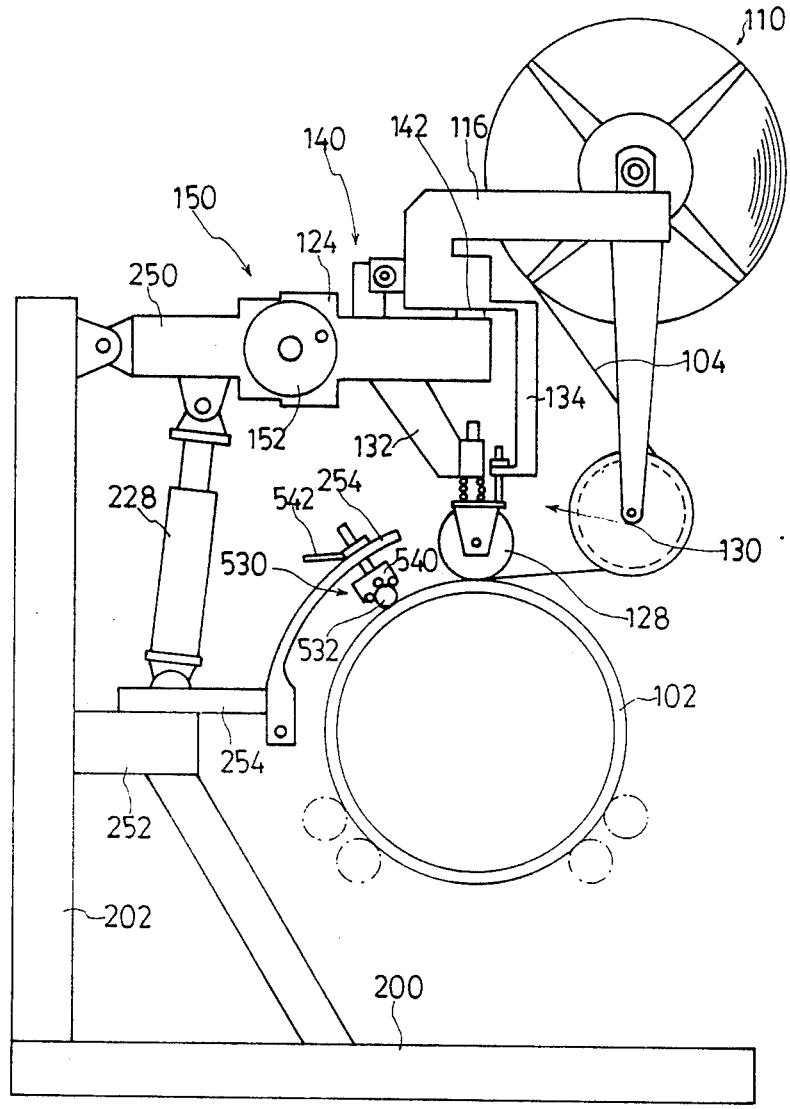
FIG. 10 is a side view of a principal portion of a protective-coated steel pipe producing equipment further embodying the invention.

Referring now to FIGS. 10 to 13, there is illustrated a sheet pressing means embodying the invention. FIG. 10 is a side view of a principal portion wherein the thermoplastic synthetic resin sheet 104 which has been fed to the outer periphery of the steel pipe 102 is pressed against the outer periphery of the steel pipe elastically by the sheet pressing means 130 and a deairing means 530.

A lateral beam 250 is attached to an upper part of the post 202 vertically pivotably in an upwardly projecting fashion. The underside of the lateral beam 250 is supported by a worm jack 228, the lower end of which is supported by the post 202.

The lateral beam 250 is provided at its front end surface with a horizontal slide means 150 wherein a slide 124 is horizontally slid in the axial direction of the steel pipe 102 by means of a rotary feed handle 152. Further, a swing means 140 is attached to the front end portion of the horizontal slide 124 so that it can swing in a horizontal plane about a swing shaft 142 by turning a handle (not shown). The sheet feed means 110 and a roll bracket 134 of the sheet pressing means 130 are attached to the swing means 140 so as to be swingable horizontally.

Figure 11:
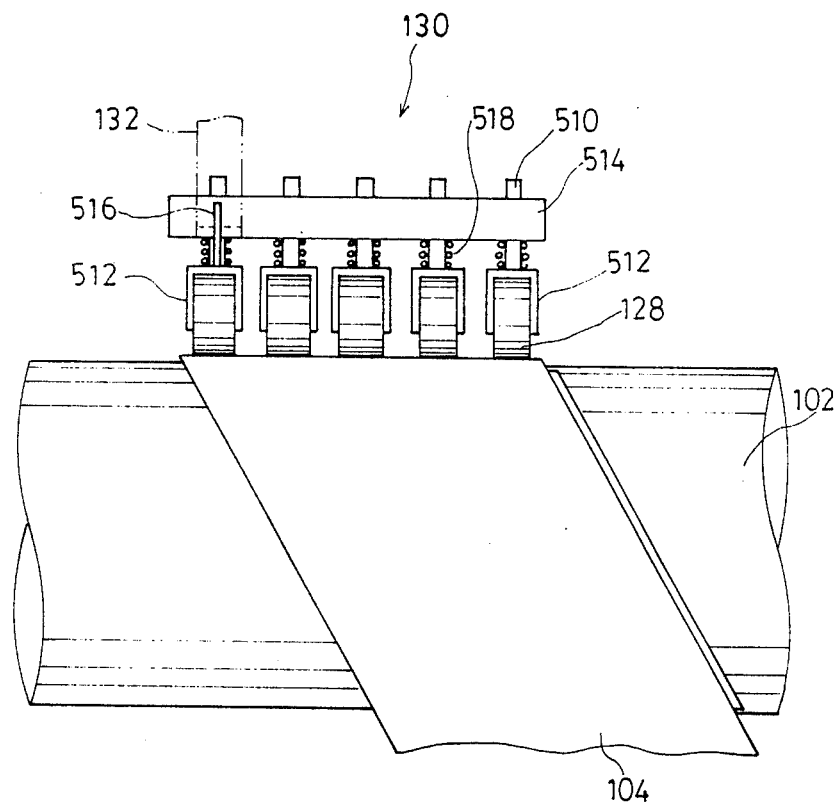
FIG. 11 is a front view thereof.

The sheet pressing means 130 is attached to the underside of the horizontal slide 124 through an arm 132. FIG. 11 is a front view of the sheet pressing means 130.

Sheet pressing rolls 128 each have an outer peripheral portion formed of a heat resisting silicone rubber for example and a rotating shaft supported by a roll bracket 512. On the upper surface of each bracket 512 are erected a swingable and vertically movable floating support shaft 510 and a swing operating shaft 516. In FIG. 11, the swing operating shaft 516 is shown for only the leftmost roll bracket and is not shown for the others. The floating support shaft 510 is disposed just above the rotating shaft of each roll 128, while the swing operating shaft 516 is erected at an end portion of the roll bracket 512 in a somewhat spaced relation to the shaft 510. A bearing 514 with the floating support shaft 510 inserted therethrough is fixed to the front end face of the arm 132 (see FIG. 10). Between the bearing 514 and the roll brackets 512 are interposed coil springs 518 which press the sheet pressing rolls 128 elastically toward the outer peripheral surface of the steel pipe 102.

The plural sheet pressing rolls 128 constructed as above are arranged at equal intervals in the longitudinal direction of the pipe 102 within the range of the width of the thermoplastic synthetic resin sheet 104. The swing rotating shafts 516 of the rolls 128 are connected interlockably through a link mechanism (not shown). Further, a swing connecting arm 134 extending downwards from one end thereof fixed to the swing shaft of the swing means 140 is slidably fitted at the other end thereof on the leftmost swing operating shaft 516 in FIG. 11.

On the downstream side of the sheet pressing rolls 128 there is disposed the deairing means 530 which presses the thermoplastic synthetic resin sheet 104 elastically throughout the entire width thereof against the outer peripheral surface of the steel pipe 102.

As shown in FIG. 10, the deairing means 530 is mounted on a ledge 252 jutting from a middle part of the post 202. More specifically, a cross feed shaft 254 is supported on the ledge 252 so as to be movable in the transverse direction of the steel pipe 102. To one end of the cross feed shaft 254 are attached a pair of curved arms 254, and a bearing bracket 540 movable along the outer peripheral surface of the steel pipe 102 is mounted to the curved arms 254, the bearing bracket 540 being normally fixed in a predetermined position by means of a handle 542.

Figure 13:
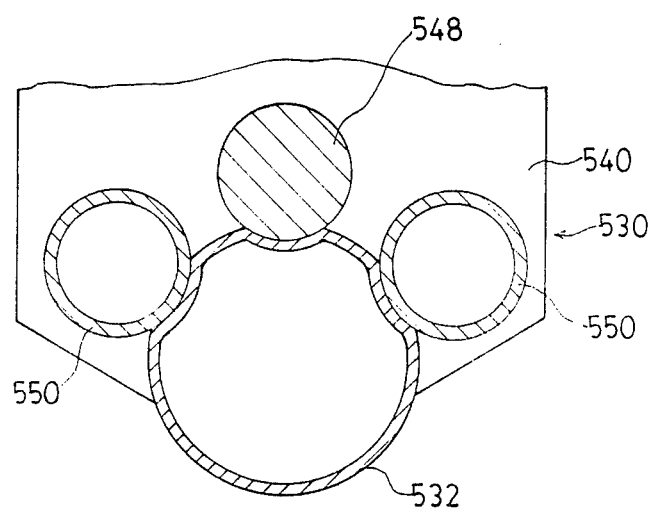
FIG. 13 is an explanatory view of a deairing means.

FIG. 13 is an enlarged view of the bearing bracket 540 of the deairing means 530, in which a straightening roll 532, a back-up roll 548 and two cooling roll 550 are rotatably supported by the bearing bracket 540. The straightening roll 532 is a hollow roll made of silicone rubber, with compressed air being fed into the hollow portion from an end of the roll. As the straightening roll 532 of the deairing means, it is not limited to a pneumatic rubber roll; there may be used a sponge roll, a brush roll or a metallic roll, if only the roll is well compatible with unevenness of the outer peripheral surface of the steel pipe and can press the sheet throughout the entire width thereof. The cooling rolls 550 are also hollow and each constituted by an iron pipe, with cold water being fed into the interior of the pipe.

The operation of the equipment shown in FIG. 10 will now be described. With operation of the swing means 140 the support frame 116 of the sheet feed means 110 swings horizontally about the swing shaft 142 of the swing means, so that an appropriate sheet feed angle can be set accurately and easily.

Figure 12:
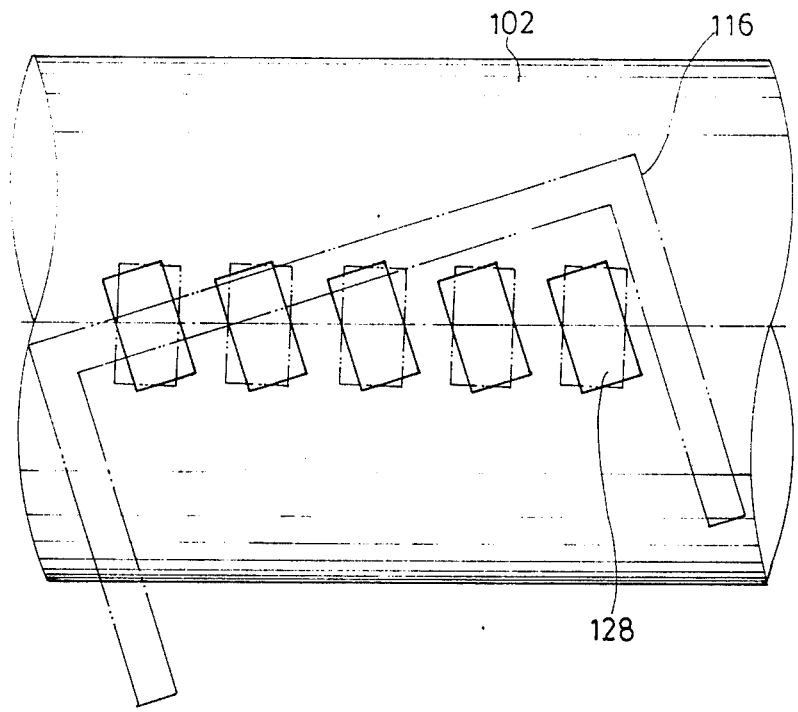
FIG. 12 is a plan view showing a rotating condition of sheet pressing rolls.

At the same time, the swing connecting arm 134 fixed to the swing shaft 142 of the swing means 140 also swings. Interlockedly, the swing operating shaft is operated, so that, as shown in FIG. 12, the five sheet pressing rolls 128 connected by a link mechanism 29 pivot integrally about the respective floating support shafts (see FIG. 11) and obliquely intersect the pipe axis as indicated by solid lines in FIG. 12, thus the rolls 128 can be positioned appropriately in the sheet feed direction to bring the sheet 104 into pressure contact with the steel pipe 102.

If the sheet pressing rolls 128 are replaced by a single roll, there is only one steel pipe pressing point when the roll is positioned obliquely with respect to the pipe axis, so it is impossible to press the sheet uniformly throughout the entire width thereof. There may be used a roll having a concavely curved surface in conformity with the curved surface of the steel pipe, but in this case many rolls are needed for different diameters of rolls.

The sheet pressing rolls 128 are divided plurally and each supported by the floating support shaft 510, so even as to an uneven portion such as weld bead of the steel pipe 102, the rolls each individually can get over such uneven portion by virtue of the resilience of each coil spring 518. Therefore, it is possible to prevent the protective coating from changing in thickness according to unevenness of the steel pipe surface.

Further, the horizontal slide 124 is moved longitudinally of the steel pipe 102 by operating the feed handle 152 of the horizontal slide means 150, whereby the sheet feed means 110 and the sheet pressing means 130 can be shifted. Therefore, the equipment can immediately cope with changes in shape and size of the steel pipe 102 or heat deformation of the thermoplastic synthetic resin sheet 104. Consequently it is easily possible to maintain the spiral shape of the wound sheet always in an appropriate condition and ensure a desired winding spacing.

The thermoplastic synthetic resin sheet 104 which has been softened by the heat of the steel pipe 102 and brought into pressure contact with the outer peripheral surface of the pipe by means of the sheet pressing rolls 128 is then pressed throughout the entire width of the sheet by the straightening roll 532 shown in FIG. 13. The straightening roll 532 is easily deformable elastically and well compatible with the unevenness of the pipe outer peripheral surface, so the air remaining in an uneven portion such as weld bead can be expelled. Consequently, the sheet 104 can be contacted more closely with the outer peripheral surface of the steel pipe to expel the residual air completely.

When the sheet 104 was wound around the pipe by a predetermined length, it is cut with a cutter.

According to the present invention, as set forth hereinabove, the thermoplastic synthetic resin sheet can be spirally wound around the steel pipe and heat melt-bonded to the pipe in close contact with the entire pipe surface, so it is possible to effectively prevent the occurrence of the peeling-off phenomenon due to rusting caused by the residual air between the protective coating and the outer peripheral surface of the steel pipe.

Besides, the steel pipe protective coating can be provided less expensively than that according to the coating material applying method. Further, the equipment is of an extremely simple structure, requiring neither a special installing foundation nor such a large-scaled manufacturing equipment as in the conventional polyethylene melt-extrusion coating method. Therefore, it becomes possible to perform a protective coating work at a construction work site; as a result, the product transporting cost and labor can be greatly reduced.

What is claimed is:

1. A method for producing a protective-coated steel pipe by winding a belt-like thermoplastic synthetic resin sheet spirally around the outer peripheral surface of a preheated steel pipe and melt-bonding the sheet onto said outer peripheral surface of the pipe, which method includes:
   heating said steel pipe to a temperature sufficient for melt bonding of said thermoplastic synthetic resin sheet;
   a winding step of winding said sheet around the outer peripheral surface of the steel pipe while contacting adjacent side end faces of the sheet in a face-to-face relation to each other to form a spiral joint defining a mountain peak with air remaining under the peak;
   a bonding step of heat melt-bonding the adjacent sheet portions to each other in the contacted state of the respective side end faces while pressing both sheet portions together by a pressing means when they begin to melt; and
   simultaneously expelling said air from said spiral joint.

2. A method according to claim 1, further including a sheet preheating step of preheating said thermoplastic synthetic resin sheet to room temperature to impart flexibility thereto prior to abutment of the sheet with the outer peripheral surface of the steel pipe.

3. A method according to claim 1, wherein a coating having a weak bonding force is formed beforehand on the outer surface portions of the steel pipe corresponding to winding start and end portions of the sheet, then said thermoplastic synthetic resin sheet is wound and melt-bonded around the outer peripheral surface of the steel pipe so as to cover said coating, and thereafter cuts are made in end portions of said melt-bonded sheet in a high temperature condition.

4. An equipment for producing a protective-coated steel pipe by winding a belt-like thermoplastic synthetic resin sheet spirally around the outer peripheral surface of a steel pipe preheated by heating means, and being rotated at a constant speed through a shaft while moving relatively in the pipe axis direction, said equipment including:
   a sheet feed means for feeding said thermoplastic synthetic resin sheet obliquely with respect to the longitudinal direction of the steel pipe so that the side end faces of the sheet are confronted with each other to form a spiral joint defining a mountain peak with air remaining under said peak, said heating means heating said resin sheet to obtain melt bonding of the confronted side end faces; and
   a confronted seam pressing means for pressing the confronted seam portion at the side ends of the sheet which has been fed by said sheet feed means and began to melt on the outer peripheral surface of the steel pipe, against the outer peripheral surface of the pipe, said seam pressing means simultaneously expelling said remaining air from said spiral joint.

5. An equipment according to claim 4, further including a sheet preheating means disposed between said sheet feed means and said sheet pressing means to preheat said thermoplastic synthetic resin sheet to room temperature.

6. An equipment for producing a protective-coated steel pipe including:
   a sheet feed means for feeding thermoplastic synthetic resin sheet obliquely with respect to a steel pipe as the pipe is relatively moving longitudinally, said sheet feed means having a rotary shaft which supports said thermoplastic synthetic resin sheet in a coilwise wound condition and which can tilt with respect to the longitudinal direction of the steel pipe;
   a sheet pressing means for pressing said sheet elastically against the outer peripheral surface of the steel pipe as the pipe is rotating about a shaft at a constant speed, said sheet feeding means feeding said resin sheet so that side end faces of the sheet are confronted with each other and form a spiral joint defining a mountain peak with air remaining under the peak, means for heating the interior of said pipe to a temperature to obtain melt bonding of the confronted end faces, said sheet pressing means having a sheet pressing roll capable of setting its rotational axis in a direction perpendicular to the direction in which the sheet is fed from said sheet feed means;

a confronted seam pressing means for pressing the confronted seam portion at the side ends of the sheet which has been fed by said sheet feed means and began to melt on the outer peripheral surface of the steel pipe, against the outer peripheral surface of the pipe, said seam pressing means simultaneously expelling said remaining air from said spiral joint; and a horizontal slide means for adjusting the sheet winding angle and winding pitch with respect to the steel pipe, said horizontal slide means having a feed mechanism for moving said sheet feed means and said sheet pressing means relatively in the longitudinal direction of the steel pipe.

7. A method according to claim 2, wherein a coating having a weak bonding force is formed beforehand on the outer surface portions of the steel pipe corresponding to winding start and end portions of the sheet, then said thermoplastic synthetic resin sheet is wound and melt-bonded around the outer peripheral surface of the steel pipe so as to cover said coating, and thereafter cuts are made in end portions of said melt-bonded sheet in a high temperature condition.

* * * * *